(12) United States Patent
Kaminski

(10) Patent No.: US 11,844,327 B2
(45) Date of Patent: Dec. 19, 2023

(54) LITTER BOX SIFTING ASSEMBLY

(71) Applicant: Ryan Kaminski, Elderon, WI (US)

(72) Inventor: Ryan Kaminski, Elderon, WI (US)

( * ) Notice: Subject to any disclaimer, the term of this patent is extended or adjusted under 35 U.S.C. 154(b) by 205 days.

(21) Appl. No.: 17/476,069

(22) Filed: Sep. 15, 2021

(65) Prior Publication Data

US 2023/0078871 A1 Mar. 16, 2023

(51) Int. Cl.
*A01K 1/01* (2006.01)

(52) U.S. Cl.
CPC ................................. *A01K 1/0114* (2013.01)

(58) Field of Classification Search
CPC ...... A01K 1/0107; A01K 1/01; A01K 1/0114; A01K 1/011
USPC ......................................................... 119/167
See application file for complete search history.

(56) References Cited

U.S. PATENT DOCUMENTS

| | | | | |
|---|---|---|---|---|
| 5,062,392 A * | 11/1991 | Lavash | ................ | A01K 1/0114 119/167 |
| 5,158,042 A * | 10/1992 | Hammerslag | ........ | A01K 1/0114 119/167 |
| 5,207,772 A * | 5/1993 | Lauretta | ............... | A01K 1/0114 119/167 |
| 5,419,282 A * | 5/1995 | Dennis | ................. | A01K 1/0114 119/168 |
| 5,551,376 A * | 9/1996 | Lundeen | ............. | A01K 1/0114 119/167 |
| D378,451 S * | 3/1997 | Schmidt | ....................... | D30/161 |
| 5,983,832 A * | 11/1999 | Seo | ...................... | A01K 1/0114 119/167 |
| 6,595,159 B1 * | 7/2003 | Montalbano | ......... | A01K 1/0114 119/167 |
| D488,890 S | 4/2004 | Radde | | |
| 8,074,603 B2 * | 12/2011 | Ohlman | ............... | A01K 1/0114 119/167 |
| 8,973,530 B2 | 3/2015 | Spreitzer | | |
| D783,907 S | 4/2017 | Ohlman | | |
| 10,206,370 B2 | 2/2019 | Huang | | |
| 2009/0194033 A1 * | 8/2009 | Modlin | ............... | A01K 1/0107 119/167 |
| 2019/0343066 A1 * | 11/2019 | Fan | ...................... | A01K 1/0114 |

* cited by examiner

*Primary Examiner* — Yvonne R Abbott-Lewis

(57) ABSTRACT

A litter box sifting assembly for sifting cat feces and clumps from cat litter includes a plurality of mesh panels that is stacked upon each other. The plurality of mesh panels are positionable on a bottom of a litter box thereby facilitating cat litter to be poured over the plurality of mesh panels. Each of the mesh panels has a plurality of grip points each integrated into the mesh panels and each of the grip points on a topmost one of the plurality of mesh panels can be gripped for lifting the topmost mesh panel upwardly. Furthermore, each of the mesh panels is comprised of a mesh material to sift cat feces and clumps from the cat litter when the mesh panels are lifted upwardly through the cat litter. In this way the cat feces and clumps can be removed from the litter box in a single motion.

4 Claims, 4 Drawing Sheets

LITTER BOX SIFTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sifting devices and more particularly pertains to a new sifting device for sifting cat feces and clump from cat litter. The device includes a plurality of mesh panels that are stacked upon each other. The plurality of mesh panels are positionable on a bottom of a litter box and cat litter can be poured over the mesh panels. A topmost one of the mesh panels can be lifted upwardly out of the litter box to sift the cat feces and clumps from the cat litter.

(2) Description of Related Art Including Information Disclosed Under 37 CFR 1.97 and 1.98

The prior art relates to sifting devices including a litter box sifting device including a litter box, a disposal bag being nested into the litter box, a plurality of mesh panels being nested into the disposal bag and an insert being positionable to extend around a perimeter of the litter box. The prior art discloses a variety of modular litter boxes that each includes a mesh panel element for sifting cat litter. The prior art discloses a variety of litter box devices that each at least includes a litter box and a mesh panel that removably engages mounting elements in the litter box for sifting cat litter. The prior art discloses a disposable insert for a litter box that includes a fluid impermeable layer and a sifting layer.

BRIEF SUMMARY OF THE INVENTION

An embodiment of the disclosure meets the needs presented above by generally comprising a plurality of mesh panels that is stacked upon each other. The plurality of mesh panels are positionable on a bottom of a litter box thereby facilitating cat litter to be poured over the plurality of mesh panels. Each of the mesh panels has a plurality of grip points each integrated into the mesh panels and each of the grip points on a topmost one of the plurality of mesh panels can be gripped for lifting the topmost mesh panel upwardly. Furthermore, each of the mesh panels is comprised of a mesh material to sift cat feces and clumps from the cat litter when the mesh panels are lifted upwardly through the cat litter. In this way the cat feces and clumps can be removed from the litter box in a single motion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
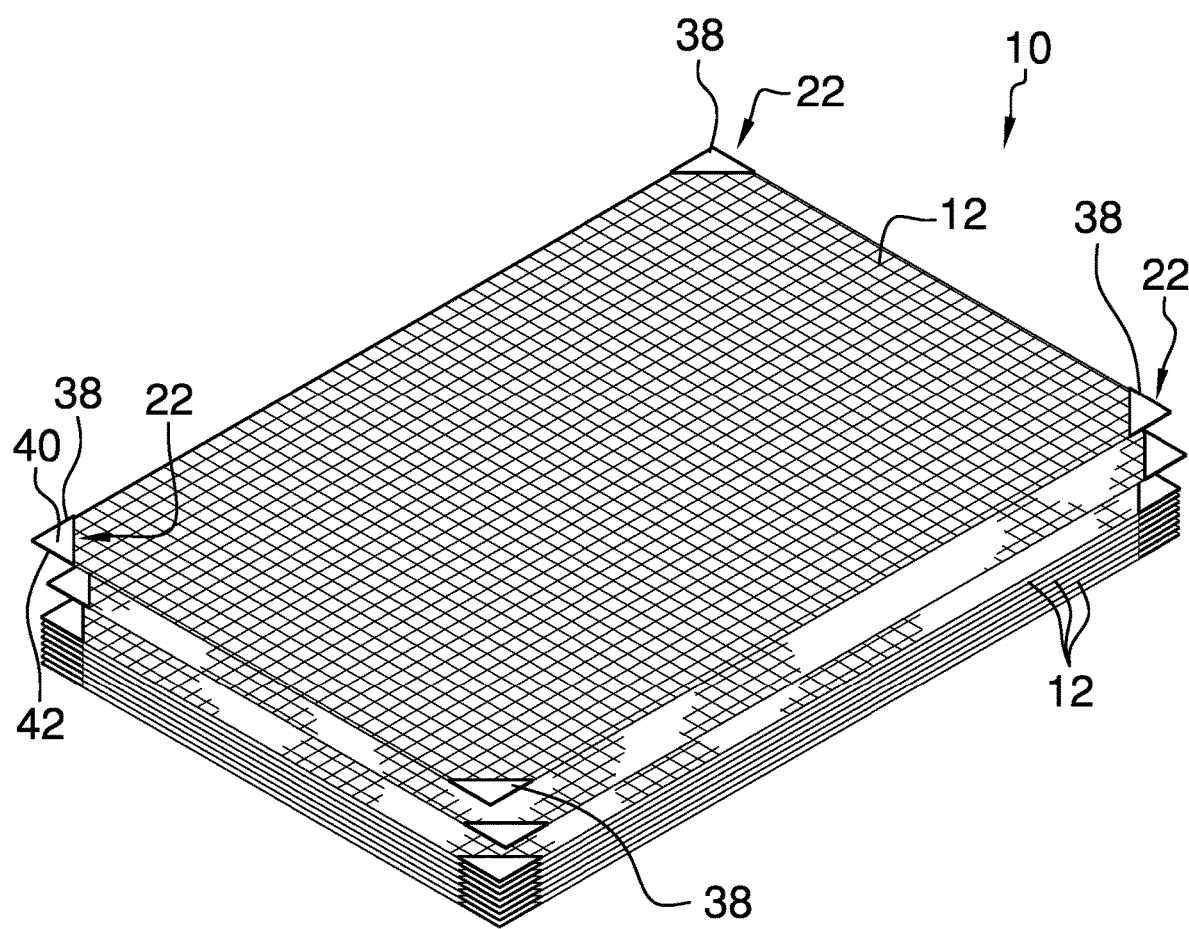
FIG. 1 is a top perspective view of a litter box sifting assembly according to an embodiment of the disclosure.
Figure 2:
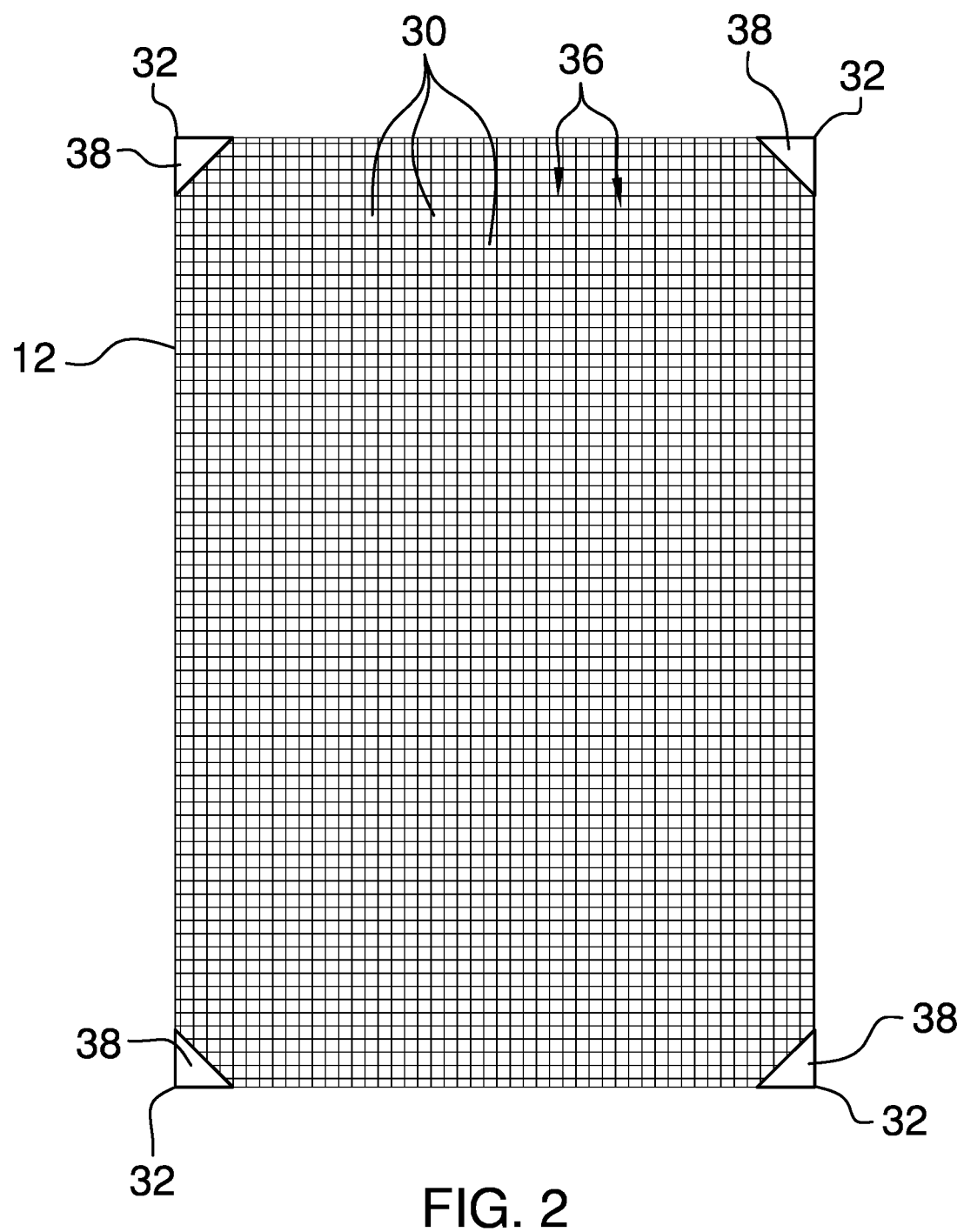
FIG. 2 is a top view of an embodiment of the disclosure.
Figure 3:
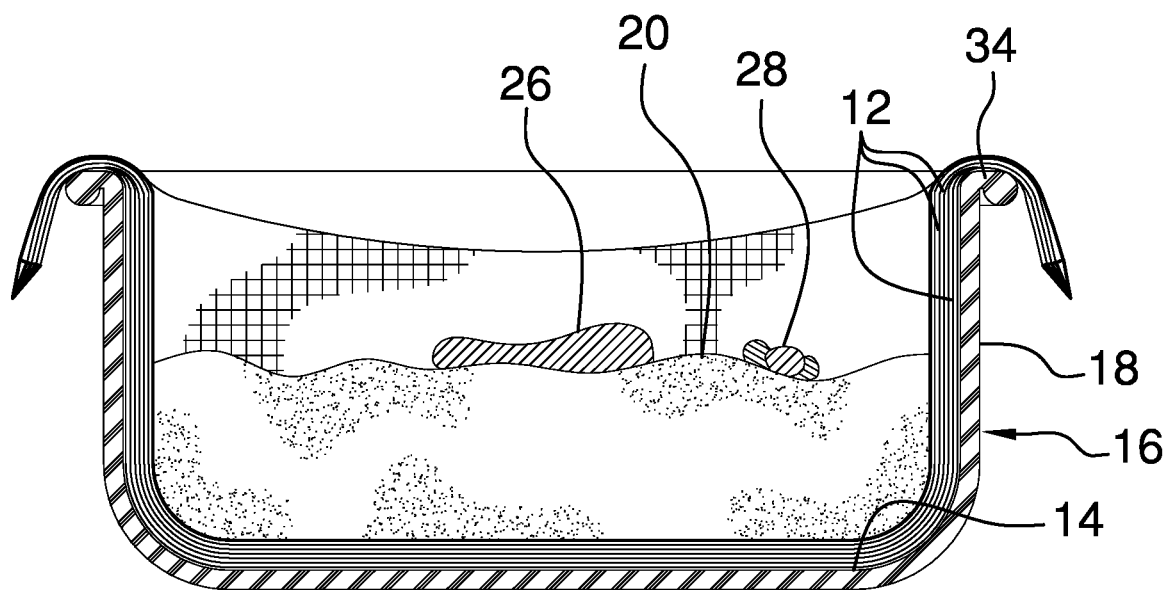
FIG. 3 is a cut-away in-use view of an embodiment of the disclosure.
Figure 4:
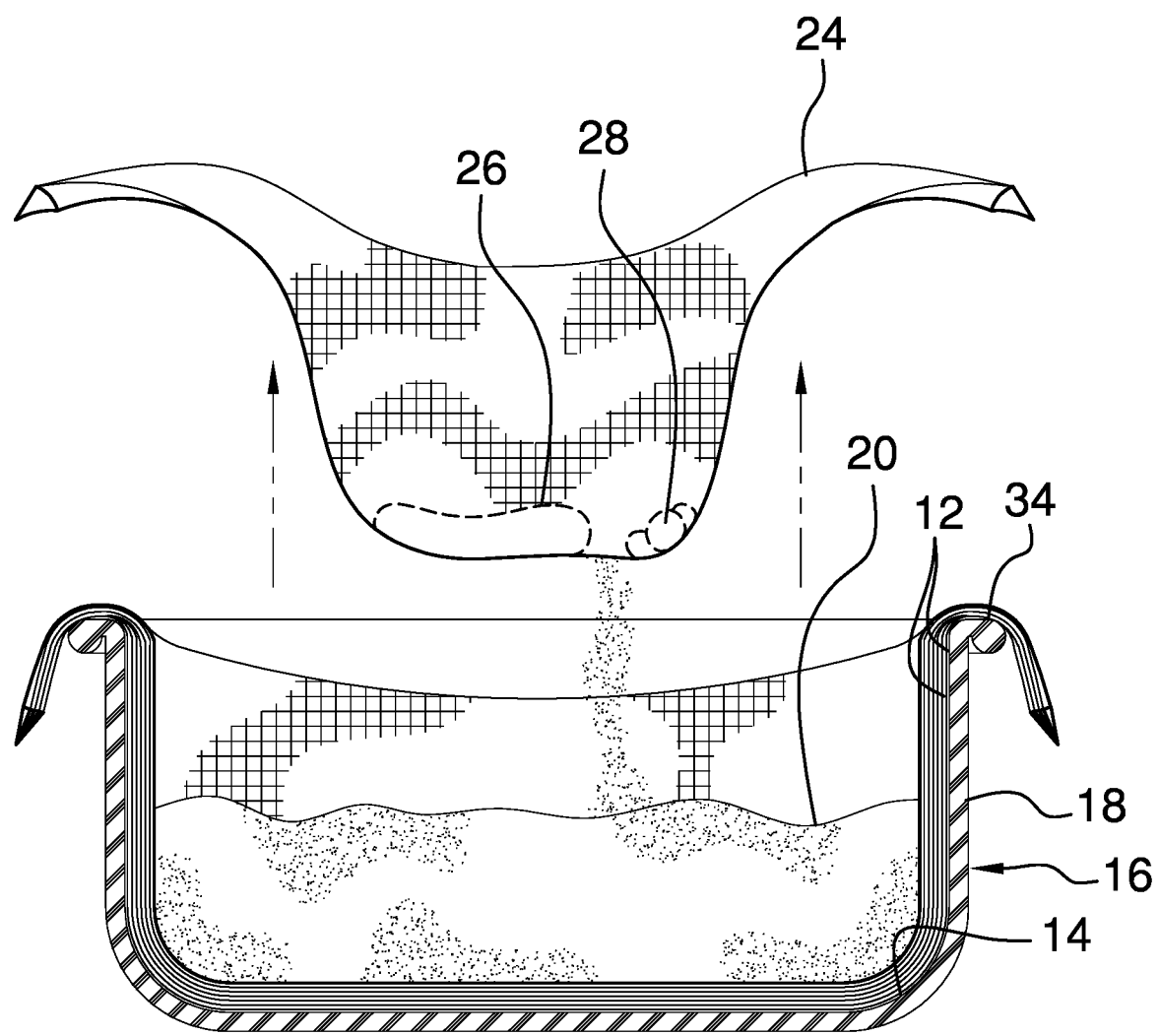
FIG. 4 is a cut-away in-use view of an embodiment of the disclosure showing a topmost mesh panel being lifted out of a litter box.

With reference now to the drawings, and in particular to FIGS. 1 through 4 thereof, a new sifting device embodying the principles and concepts of an embodiment of the disclosure and generally designated by the reference numeral 10 will be described.

As best illustrated in FIGS. 1 through 4, the litter box sifting assembly 10 generally comprises a plurality of mesh panels 12 that is stacked upon each other. The plurality of mesh panels 12 are positionable on a bottom 14 of a litter box 16 thereby facilitating cat litter 20 to be poured over the plurality of mesh panels 12. Each of the mesh panels 12 has a plurality of grip points 22 each being integrated into the mesh panels 12. In this way the grip points 22 on a topmost one of the plurality of mesh panels 24 can be gripped for lifting the topmost mesh panel 24 upwardly. Furthermore, each of the mesh panels 12 is comprised of a mesh material to sift cat feces 26 and clumps 28 from the cat litter 20 when the mesh panels 12 are lifted upwardly through the cat litter 20. In this way the cat feces 26 and clumps 28 can be removed from the litter box 16 in a single motion.

Each of the mesh panels 12 is comprised of a plurality of intersecting lines 30 defining a grid which has four corners 32. Each of the plurality of mesh panels 12 has a width that is substantially greater than a width of the litter box 16. In this way the plurality of mesh panels 12 drapes over a top 34 of an outer wall 18 of the litter box 16 when the plurality of mesh panels 12 is positioned on the bottom 14 wall of the litter box 16. Thus, each of the four corners 32 of each of the mesh panels 12 is exposed for gripping. Each of the mesh panels 12 may have a width of at least 32.0 inches and length of at least 34.0 inches. Additionally, the intersecting lines 30 may define openings 36 that have a length and a width of approximately 0.25 inches.

A plurality of tabs 38 is each positioned over a respective one of the four corners 32 of a respective one of the mesh panels 12. Each of the tabs 38 defines a respective one of the grip points 22 on a respective one of the mesh panels 12 thereby facilitating each of the tabs 38 be gripped. Each of the tabs 38 has a top side 40 and a bottom side 42 such that each of the mesh panels 12 is positioned between the top side 40 and the bottom side 42 of a respective one of the tabs 38. Moreover, each of the tabs 38 on each of the four corners 32 of the topmost mesh panel 24 is lifted such that the topmost mesh panel 24 forms a bowl. In this way the topmost mesh panel 24 contains the cat feces 26 and clumps 28 when the cat litter 20 is sifted through the topmost mesh panel 24. Each of the tabs 38 is comprised of a resilient material, such as rubber, leather or other similar material, to enhance gripping the tabs 38.

In use, the plurality of mesh panels 12 is laid onto the bottom 14 of the litter box 16 such that the mesh panels 12 drape over the outer wall 18 of the litter box 16. The cat litter 20 is poured into the littler box 16 over the plurality of mesh panels 12. The tabs 38 on the topmost mesh panel 24 are gripped and the topmost mesh panel 24 is lifted upwardly to sift cat feces 26 and clumps 28 from the cat litter 20. Additionally, the topmost mesh panel 24 captures the cat feces 26 and clumps 28 for subsequent disposal. In this way the cat feces 26 and clumps 28 can be removed from the cat litter 20 in a single motion. The plurality of mesh panels 12 are replaced when all of the mesh panels 12 have been removed from the litter box 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A litter box sifting assembly for sifting cat litter in a litter box, said assembly comprising:
    a plurality of mesh panels, said plurality of mesh panels being stacked upon each other wherein said plurality of mesh panels is configured to be positioned on a bottom of a litter box thereby facilitating cat litter to be poured over said plurality of mesh panels, each of said mesh panels having a plurality of grip points each being integrated into said mesh panels wherein each of said grip points on a topmost one of said plurality of mesh panels is configured to be gripped for lifting said topmost mesh panel upwardly, each of said mesh panels being comprised of a mesh material wherein said mesh panels are configured to sift cat feces and clumps from the cat litter when said mesh panels are lifted upwardly through the cat litter thereby facilitating the cat feces and clumps to be removed from the litter box in a single motion;
    wherein each of said mesh panels is comprised of a plurality of intersecting lines defining a grid having four corners, each of the plurality of mesh panels having a width being substantially greater than a width of the litter box such that said plurality of mesh panels drapes over a top of an outer wall of the litter box when said plurality of mesh panels is positioned on the bottom wall of the titter box wherein each of said four corners of each of said mesh panels is configured to be exposed for gripping; and
    a plurality of tabs, each of said tabs being positioned over a respective one of said four corners of a respective one of said mesh panels, each of said tabs defining a respective one of said grip points on a respective one of said mesh panels wherein each of said tabs is configured to be gripped, each of said tabs being triangular having a pair of sides aligned with a peripheral edge of said respective one of said mesh panels whereby each tab is positioned within a boundary defined by said peripheral edge of said respective one of said mesh panels.

2. The assembly according to claim 1, wherein:
    each of said tabs having a top side and a bottom side such that each of said mesh panels is positioned between said top side and said bottom side of a respective one of said tabs.

3. A litter box sifting assembly for sifting cat litter in a litter box, said assembly comprising:
    a plurality of mesh panels, said plurality of mesh panels being stacked upon each other wherein said plurality of mesh panels is configured to be positioned on a bottom of a litter box thereby facilitating cat litter to be poured over said plurality of mesh panels, each of said mesh panels having a plurality of grip points each being integrated into said mesh panels wherein each of said grip points on a topmost one of said plurality of mesh panels is configured to be gripped for lifting said topmost mesh panel upwardly, each of said mesh panels being comprised of a mesh material wherein said mesh panels are configured to sift cat feces and clumps from the cat litter when said mesh panels are lifted upwardly through the cat litter thereby facilitating the cat feces and clumps to be removed from the litter box in a single motion, each of said mesh panels being comprised of a plurality of intersecting lines defining a grid having four corners, each of the plurality of mesh panels having a width being substantially greater than a width of the litter box such that said plurality of mesh panels drapes over a top of an outer wall of the litter box when said plurality of mesh panels is positioned on the bottom wall of the litter box wherein each of said four corners of each of said mesh panels is configured to be exposed for gripping; and
    a plurality of tabs, each of said tabs being positioned over a respective one of said four corners of a respective one of said mesh panels, each of said tabs defining a respective one of said grip points on a respective one of said mesh panels wherein each of said tabs is configured to be gripped, each of said tabs being triangular having a pair of sides aligned with a peripheral edge of said respective one of said mesh panels whereby each tab is positioned within a boundary defined by said peripheral edge of said respective one of said mesh panels, each of said tabs having a top side and a bottom side such that each of said mesh panels is positioned between said top side and said bottom side of a respective one of said tabs, each of said tabs on each of said four corners of said topmost mesh panel being lifted such that said topmost mesh panel forms a bowl wherein said topmost mesh panel is configured to contain the cat feces and clumps when the cat litter is sifted through said topmost mesh panel, each of said tabs being comprised of a resilient material wherein each of said tabs is configured to enhance gripping said tabs.

4. A litter box sifting system for sifting cat litter in a litter box, said system comprising:

a litter box having a bottom wall and an outer wall extending upwardly from said bottom wall wherein said litter box is configured to contain cat litter;

a plurality of mesh panels, said plurality of mesh panels being stacked upon each other, said plurality of mesh panels being positionable on said bottom wall of said litter box thereby facilitating cat litter to be poured over said plurality of mesh panels, each of said mesh panels having a plurality of grip points each being integrated into said mesh panels wherein each of said grip points on a topmost one of said plurality of mesh panels is configured to be gripped for lifting said topmost mesh panel upwardly, each of said mesh panels being comprised of a mesh material wherein said mesh panels are configured to sift cat feces and clumps from the cat litter when said mesh panels are lifted upwardly through the cat litter thereby facilitating the cat feces and clumps to be removed from said litter box in a single motion, each of said mesh panels being comprised of a plurality of intersecting lines defining a grid having four corners, each of the plurality of mesh panels having a width being substantially greater than a width of said litter box such that said plurality of mesh panels drapes over a top of said outer wall of said litter box when said plurality of mesh panels is positioned on the bottom wall of said litter box wherein each of said four corners of each of said mesh panels is configured to be exposed for gripping; and a plurality of tabs, each of said tabs being positioned over a respective one of said four corners of a respective one of said mesh panels, each of said tabs defining a respective one of said grip points on a respective one of said mesh panels wherein each of said tabs is configured to be gripped, each of said tabs being triangular having a pair of sides aligned with a peripheral edge of said respective one of said mesh panels whereby each tab is positioned within a boundary defined by said peripheral edge of said respective one of said mesh panels, each of said tabs having a top side and a bottom side such that each of said mesh panels is positioned between said top side and said bottom side of a respective one of said tabs, each of said tabs on each of said four corners of said topmost mesh panel being lifted such that said topmost mesh panel forms a bowl wherein said topmost mesh panel is configured to contain the cat feces and clumps when the cat litter is sifted through said topmost mesh panel, each of said tabs being comprised of a resilient material wherein each of said tabs is configured to enhance gripping said tabs.

* * * * *